United States Patent
Ghayal et al.

(10) Patent No.: US 9,658,666 B1
(45) Date of Patent: May 23, 2017

(54) DYNAMIC CAPACITOR MODULATED VOLTAGE REGULATOR

(71) Applicant: Intel Corporation, Santa Clara, CA (US)

(72) Inventors: Rupak Ghayal, Bangalore (IN); Venkata S. Nittala, Rajahmundry (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/974,788

(22) Filed: Dec. 18, 2015

(51) Int. Cl.
*G06F 1/32* (2006.01)
*G06F 1/26* (2006.01)
*G06F 1/00* (2006.01)
*H02M 3/158* (2006.01)

(52) U.S. Cl.
CPC .............. *G06F 1/26* (2013.01); *H02M 3/158* (2013.01); *G06F 1/32* (2013.01)

(58) Field of Classification Search
CPC ..................................... G06F 1/32; G06F 1/26
See application file for complete search history.

(56) References Cited

U.S. PATENT DOCUMENTS

| 6,069,833 | A * | 5/2000 | Koura | G11C 5/147 365/226 |
| 7,180,354 | B2 * | 2/2007 | Gabillard | H03F 3/45775 327/307 |
| 7,233,132 | B1 * | 6/2007 | Dong | H02M 3/1584 323/272 |
| 2007/0183006 | A1 * | 8/2007 | Lee | H04N 5/378 358/513 |
| 2008/0252272 | A1 * | 10/2008 | Lipcsei | H02M 3/06 323/272 |
| 2011/0089918 | A1 * | 4/2011 | Chang | H02M 3/156 323/282 |
| 2012/0139507 | A1 * | 6/2012 | Ferguson | H02M 3/158 323/234 |
| 2015/0280557 | A1 * | 10/2015 | Xue | H02M 3/157 323/271 |
| 2016/0190926 | A1 * | 6/2016 | Ni | G05F 1/56 323/271 |

* cited by examiner

*Primary Examiner* — Phil Nguyen
(74) *Attorney, Agent, or Firm* — Schwegman Lundberg & Woessner, P.A.

(57) ABSTRACT

Some embodiments include apparatuses and method using a first node to receive an input voltage, a second node to provide an output voltage, circuit lanes coupled to the first and second nodes, each of the circuit lanes including switches coupled between the first and second nodes, and a controller to selectively place at least one circuit lane among the circuit lanes in an activated state to cause the at least one circuit lane to control the switches in order to adjust an amount of charge provided from a capacitor network to the output node based on a toggling frequency of a comparator output signal generated based on a comparison between a value of a reference voltage and a value of a feedback voltage generated from a value of the output voltage.

17 Claims, 9 Drawing Sheets

DYNAMIC CAPACITOR MODULATED VOLTAGE REGULATOR

TECHNICAL FIELD

Embodiments described herein pertain to power management in electronic items. Some embodiments relate to voltage regulators.

BACKGROUND

Many electronic devices or systems, such as computers, tablets, and cellular phones, have a voltage regulator to maintain voltages used by components in the device or system at proper values. Voltage regulators are often designed to operate within specific parameters, such as output ripple, efficiency, and power overhead. For some types of voltage regulators, avoiding design impacts on these parameters may pose a challenge.

DETAILED DESCRIPTION

Some voltage regulators have a flying capacitor to provide charge to a node, which can provide a voltage for use in a load (e.g., a functional unit in a device or system). For power management in such voltage regulators, the ability to dynamically control the charge provided by the capacitor under different operating activities plays a key role. Plus, for some modes of operation (e.g., sleep mode) where power consumption of the load is small, a high efficiency voltage regulator solution is preferable. Some conventional voltage regulators may provide these features but they may be designed for a given load current and output voltages.

In conventional voltage regulators, the output ripple is a function of values of the flying capacitor, output capacitor, load current, switching frequency, and the resistance (e.g., size) of switches used in the voltage regulators. Moreover, efficiency is a function of resistance of switches and switching frequency. Some conventional voltage regulators may use a hysteretic mode or pulse-frequency modulation (PFM) mode to improve the efficiency across load conditions. The output voltage ripple is determined by the charge dumped by the flying capacitor on the output capacitor and also the charge taken out by load current from the output capacitor. At low load current, charge taken out by output load current reduces, and as charge dumped by a flying capacitor remains the same, output voltage ripple increases. To reduce ripple, switching frequency can be increased and it reduces the charge dumped by the flying capacitor in a cycle. However this has an adverse impact on efficiency.

Some conventional techniques may use multi-phase capacitor-switch circuitry in order to reduce the ripple. However, such multi-phase capacitor-switch circuitry may need to keep switching even at low load current (to keep the ripple low), thereby reducing efficiency at low load current. Further, the frequency of each phase of such multi-phase capacitor-switch circuitry may keep dropping as the number of phases keeps increasing when the input frequency is constant. Thus, beyond a certain point, the reduction in ripple may diminish with an increase in the number of phases.

In some other conventional techniques, to improve the ripple across load conditions, the flying capacitor is switched every cycle and the resistance of the switch is controlled through an analog control loop. This analog control loop has additional design complexity, feedback compensation requirements, area overhead, and design turnaround time.

The technique described herein addresses several issues associated with some types of voltage regulators and provides improvements over conventional techniques. For example, the technique described herein can reduce the ripple across load current range based on control of one or more flying capacitors being switched each cycle from detection of change in load current, input supply, output voltage, etc. The technique described herein can also improve efficiency across load current range by, for example, switching fewer switches at low load currents. A controller in the technique described herein can be a digital controller. Thus, it can be less complex than some conventional (e.g., analog) controllers, and can result in low ripple across load current range and input and output voltage ranges. Further, the technique described herein can reduce the device area and power overhead.

Figure 1:
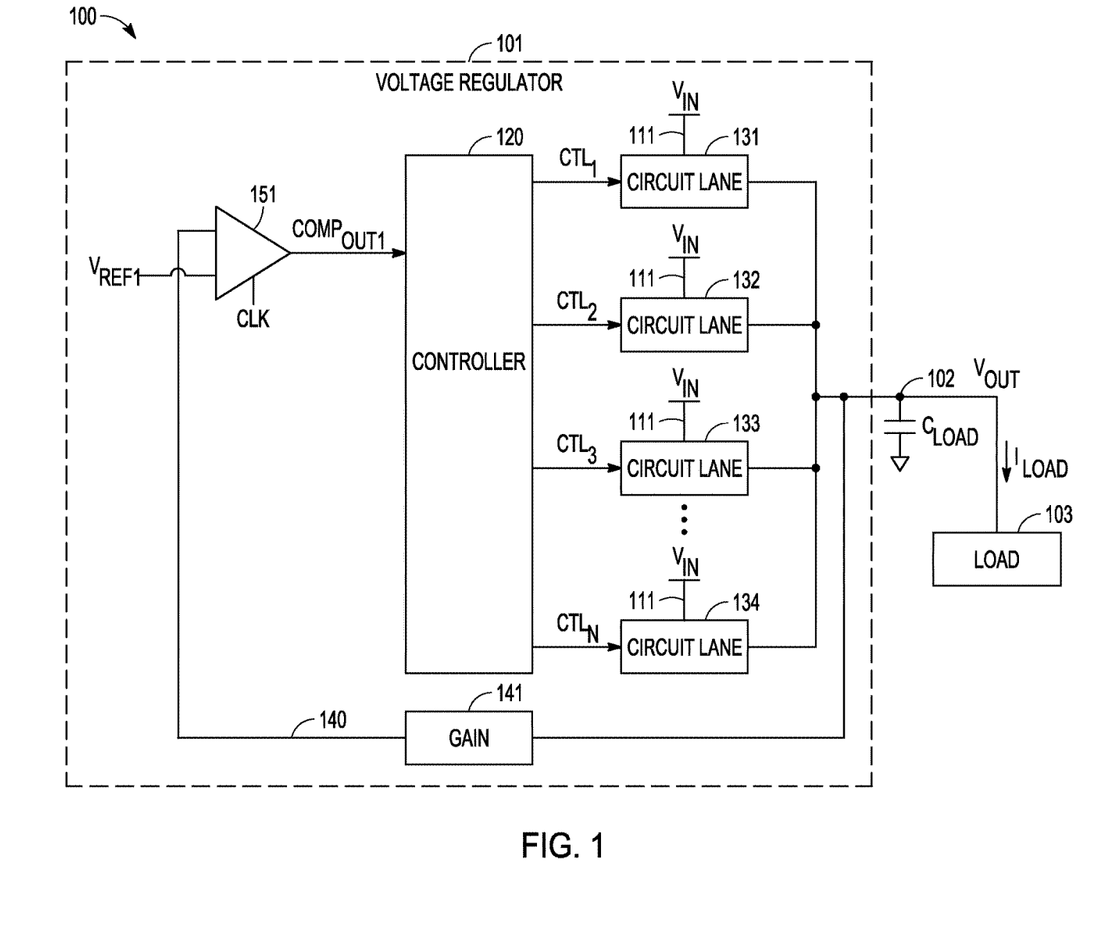
FIG. 1 shows an apparatus including a voltage regulator, according to some embodiments described herein.

FIG. 1 shows an apparatus 100 including a voltage regulator 101, according to some embodiments described herein. Apparatus 100 can include or be included in an electronic device or system, such as a computer (e.g., desktop, laptop, or notebook), a tablet, a cellular phone, a system on chip (SoC), or other electronic devices or systems. Voltage regulator 101 can be arranged to control (e.g., regulate) the value of a voltage $V_{OUT}$ (e.g., regulated output voltage) at a node (e.g., output node) 102. Voltage $V_{OUT}$ can be provided (e.g., as a supply voltage) to other components, such as a load 103, of apparatus 100. Examples of load 103 include a processor, such as a central processing unit (CPU), a memory device, and other electronic components of apparatus 100.

Voltage regulator 101 can be included in an integrated circuit (IC) die (e.g., an IC chip, such as a semiconductor chip). Apparatus 100 can also include a capacitor (e.g., load capacitor) $C_{LOAD}$ coupled to node 102. Voltage regulator 101, load 103, and capacitor $C_{LOAD}$ can be included in the same IC die or in separate IC dies. For example, in some arrangements, voltage regulator 101, load 103, and capacitor $C_{LOAD}$ can be included in the same IC die (e.g., same IC chip). In other arrangements, voltage regulator 101 and one of load 103 and capacitor $C_{LOAD}$ can be included in the same IC die.

As shown in FIG. 1, voltage regulator 101 can include a node (e.g., input node) 111 to receive a voltage (e.g., input voltage) $V_{IN}$, which can be a supply voltage provided by a power source, such as a battery. Voltage regulator 101 can generate voltage $V_{OUT}$ from voltage $V_{IN}$, such that the value of voltage $V_{OUT}$ can be less than the value of voltage $V_{IN}$. Alternatively, the value of voltage $V_{IN}$ can be less than the value of voltage $V_{OUT}$.

Voltage regulator 101 can include a controller 120 and circuit lanes 131, 132, 133, and 134. FIG. 1 shows voltage regulator 101 including a number of four (e.g., N=4) circuit lanes 131, 132, 133, and 134 as an example. However, the number of circuit lanes (e.g., N) can be different from four.

Voltage regulator 101 can include a capacitor network that can be alternately couple to nodes 111 and 102 in order to provide (e.g., transfer) charge from node 111 (at voltage $V_{IN}$) to node 102 (at voltage $V_{OUT}$). The capacitor network can include a single capacitor (e.g., a single flying capacitor) or multiple capacitors (e.g., multiple flying capacitors). Some arrangements of the capacitor network associated with circuit lanes 131, 132, 133, and 134 are shown in detail in FIG. 4, FIG. 5A, and FIG. 5B.

In FIG. 1, circuit lanes 131, 132, 133, and 134 can be arranged to control the amount of charge (from the capacitor network) contributed by that particular circuit lane to node 102. Thus, the value of voltage $V_{OUT}$ at node 102 can be determined by the charge controlled by circuit lanes 131, 132, 133, and 134.

Controller 120 can be a digital controller, which can be arranged to provide control signals $CTL_1$, $CTL_2$, $CTL_2$, and $CTL_N$ to selectively activate or deactivate (e.g., turn on or turn off) circuit lanes 131, 132, 133, and 134, respectively. When controller 120 activates a particular circuit lane among circuit lanes 131, 132, 133, and 134, the particular circuit lane becomes an activated circuit lane. When controller 120 deactivates a particular circuit lane among circuit lanes 131, 132, 133, and 134, the particular circuit becomes a deactivated circuit lane. A deactivated circuit lane can also be the one that has not been activated at power-on (or power-up) in voltage regulator 101.

Each circuit lanes 131, 132, 133, and 134 can be placed in an activated state or a deactivated state by controller 120, based on the value (e.g., signal level) the respective control signal. For example, controller 120 can cause control signal $CTL_1$ to be at one level (e.g., high) in order to place circuit lane 131 in an activated state. Controller 120 can cause control signal $CTL_1$ to be at another level (e.g., low) in order to place circuit lane 131 in a deactivated state.

When a particular circuit lane is placed in an activated state, it can control (e.g., increase) the amount of charge (from the capacitor network) contributed by that particular circuit lane to node 102. For example, an activated circuit lane can alternately couple a portion of the capacitor network (capacitor network having multiple capacitors) or alternatively couple the entire capacitor network (capacitor network having only one capacitor) to nodes 111 and 102 in order to provide (e.g., transfer) charge from node 111 (at voltage $V_{IN}$) to node 102 (at voltage $V_{OUT}$).

When an activated circuit lane is deactivated (e.g., placed in a deactivated state), it may not transfer (e.g., may not control or stop controlling) the amount of charge contributed by that particular circuit lane to node to node 102. For example, a deactivated circuit lane may not be able to alternately couple the capacitor network to nodes 111 and 102.

The value of voltage $V_{OUT}$ can be controlled by the number of activated circuit lanes among circuit lanes 131, 132, 133, and 134. The number of activated circuit lanes can be zero, one, or greater than one. Thus, the number of activated circuit lanes described herein can be zero circuit lanes being activated, one circuit lane being activated, or multiple circuit lanes being activated. As described in more detail below, controller 120 can dynamically activate or deactivate the number of activated circuit lanes in order to dynamically control the charging and discharging the capacitor network to improve operations (e.g., reduce ripple and increase efficiency of voltage regulator 101).

Controller 120 can generate (e.g., activate) control signals $CTL_1$, $CTL_2$, $CTL_2$, and $CTL_N$ based on the number of activated circuit lanes used to (e.g., needed to) adjust the amount of charge provided to node 102 in order to adjust the value of voltage $V_{OUT}$. For example, controller 120 can selectively activate (or deactivate) a portion of the circuit lanes 131, 132, 133, and 134 based on the value of voltage $V_{OUT}$ and the value of voltage $V_{REF1}$ (e.g., reference voltage).

As shown in FIG. 1, voltage regulator 101 can include a feedback path 140, which can have a gain 141 (such as a resistive voltage divider). Feedback path 140 can provide a voltage (e.g., feedback voltage) $V_{FB}$ based on (e.g., proportional to) the value of voltage $V_{OUT}$. During operations of apparatus 100, the value of voltage $V_{OUT}$, $V_{IN}$, or both may change. The change may be caused by changes in operating conditions (e.g., changes in voltage $V_{IN}$, operating temperature, or both). The change may also be caused by changes in current LOAD at load 103. Controller 120 can operate to activate (or deactivate) circuit lanes 131, 132, 133, and 134 (e.g., to adjust the number of activated (or deactivated) circuit lanes) based on the value of voltage $V_{FB}$ and the value of voltage $V_{REF1}$ in order to adjust the value of voltage $V_{OUT}$. This allows controller 120 to maintain the value of voltage $V_{OUT}$ at a specific value (e.g., a pre-determined value based on the value of voltage $V_{REF1}$).

As shown in FIG. 1, voltage regulator 101 can include comparator 151, which can be a clocked comparator (e.g., bang-bang PFM comparator). Comparator 151 can operate to compare the values of voltages $V_{FB}$ and $V_{REF1}$ and generate signal (comparator output signal) $COMP_{OUT1}$ having a value (e.g., voltage value) based on the result of the comparison. A signal (e.g., clock signal) CLK can be used in comparator 151. Comparator 151 can operate using signal CLK, such that signal $COMP_{OUT1}$ can have levels shown in FIG. 2.

Figure 2:
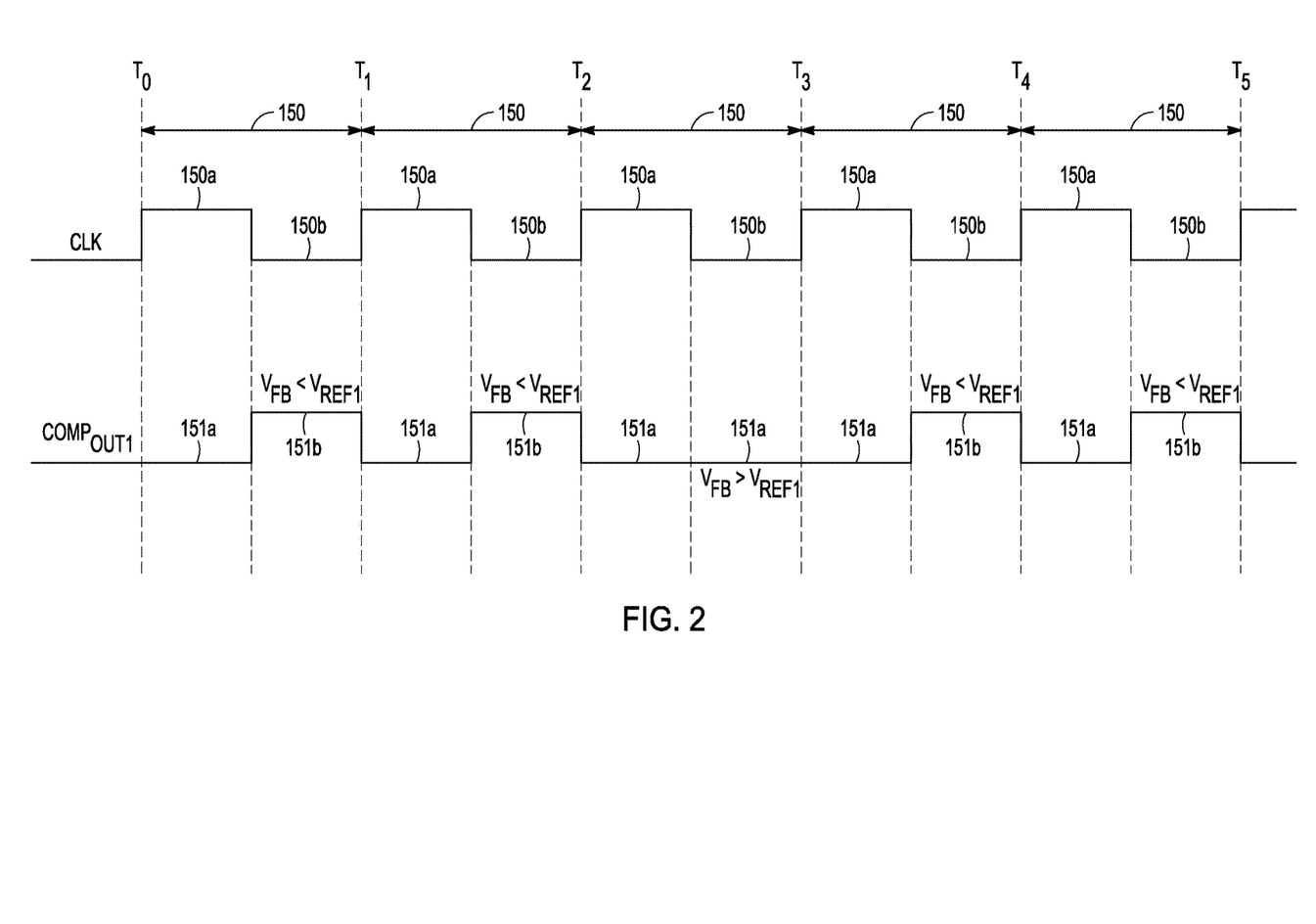
FIG. 2 is an example timing diagram for some signals of the voltage regulator of FIG. 1, according to some embodiments described herein.

FIG. 2 is an example timing diagram for the levels of signal CLK, and the levels of signal $COMP_{OUT1}$ based on the values of voltages $V_{FB}$ and $V_{REF1}$, according to some embodiments described herein. As shown in FIG. 2, signal CLK can have a period 150. Signal $COMP_{OUT1}$ can have the same level 151a (e.g., zero) during the portion of each period 150 when signal CLK has level 150a (e.g., high level). Signal $COMP_{OUT1}$ can have different levels (e.g., either level 151a or 151b) during the portion of each period 150 when signal CLK has level 150b (e.g., low level), depending on the values of voltage $V_{FB}$ relative to the value of voltage $V_{REF1}$. Level 151a and level 151b can correspond to logics one ("1") and logic zero ("0"), respectively.

The example associated with of FIG. 2 assumes that $V_{FB}<V_{REF1}$ (the value of voltage $V_{FB}$ is less than the value of voltage $V_{REF1}$) during the portion of each period 150 when signal CLK has level 150a between times T0 and T1, T1 and T2, T3 and T4, and T4 and T5. In FIG. 2, it is also assumed that $V_{FB}>V_{REF1}$ (the value of voltage $V_{FB}$ is greater than the value of voltage $V_{REF1}$) during the portion of period 150 when signal CLK has level 150b between times T2 and T3.

As shown in FIG. 2, signal $COMP_{OUT1}$ can toggle (change) from level 151a to level 151b if $V_{FB}<V_{REF1}$ during the portion of period 150 when signal CLK has level 150b. Signal $COMP_{OUT1}$ can remain at level 151a (does not toggle from level 151a to level 151b) if $V_{FB}>V_{REF1}$ during the portion of period 150 when signal CLK has level 150b (e.g., between times T2 and T3). Thus, in the example of FIG. 2, signal $COMP_{OUT1}$ toggles (changes from level 151a to 151b) during each period 150 between times T0 and T5 except for period 150 between times T2 and T3. This means that signal $COMP_{OUT1}$ skips toggling (e.g. skips changing) from level 151a to 151b in period 150 between times T2 and T3. Based on the levels of signal $COMP_{OUT1}$, controller 120 can activate or deactivate an appropriate number of circuit lanes 131, 132, 133, and 134 to control the ripple and efficiency across load current range (e.g., across values of $I_{LOAD}$).

Comparator 151 can compare the value of voltage $V_{REF1}$ with the value of voltage $V_{FB}$ at each period 150 (FIG. 2) of signal CLK. The value of voltage $V_{OUT}$ is regulated based on the levels of signal $COMP_{OUT1}$ of comparator 151. As described above, during the portion of period 150 when signal CLK has level 150a, signal $COMP_{OUT1}$ goes to level 151a (e.g., zero). If $V_{FB}<V_{REF1}$, then signal $COMP_{OUT1}$ toggles from level 151a to level 151b when signal CLK goes from level 150a to level 150b. Otherwise (e.g., if $V_{FB}>V_{REF1}$), signal $COMP_{OUT1}$ remains at level 151a during the portion of period 150 when signal CLK has level 150b.

As load current (e.g., $I_{LOAD}$) increases, the value of voltage $V_{OUT}$ decreases. Since voltage $V_{FB}$ is generated based on voltage $V_{OUT}$, the value of voltage $V_{FB}$ also decreases. This means $V_{FB}<V_{REF1}$. This causes signal $COMP_{OUT1}$ to go to level 151b more frequently, thereby increasing the toggling frequency of signal $COMP_{OUT1}$ (e.g., signal $COMP_{OUT1}$ toggles between levels 151a and 151b more often). The toggling to from one level (e.g., logic zero) to another level (e.g., logic one) of signal $COMP_{OUT1}$ can be used as an indication of the load current. In order to reduce the ripple as a function of load current, controller 120 can operate to dynamically control the charging (and discharging) of a capacitor network based on the comparator output frequency (e.g., the frequency of the toggling of signal $COMP_{OUT1}$). Based on the toggling of signal $COMP_{OUT1}$, controller 120 can place more circuit lanes among circuit lanes 131, 132, 133, and 134 in an activated state (e.g., increase the number of circuit lanes to be in the activated state). As described above, an increase in the number of activated circuit lanes may increase the amount of charge (e.g., push more charge) from node 111 to node 102. Therefore, the value of voltage $V_{OUT}$ increases. These operations (feedback and dynamically control the charging (and discharging) of a capacitor network) regulate the value of voltage $V_{OUT}$ to maintain it at a proper value.

Some techniques may use a flying capacitor to provide charge to the output of a conventional voltage regulator, such that at low load current, the output of the conventional voltage regulator may slowly discharge. When the output goes below a reference voltage, a comparator in such a voltage regulator may toggle again to switch a flying capacitor in the capacitor network. Each time the flying capacitor switches it puts nearly the same charge at the output. Thus, each time the flying capacitor switches, the same amount of charge transferred to the output node causes higher ripple in situations when load current decreases because most of the switched charge is used to charge the output capacitor (e.g., load capacitor coupled to the output of the voltage regulator). In some conventional voltage regulators, the flying capacitor is often determined by the maximum load current requirement for keeping the output impedance low. Thus, in some conventional voltage regulators, the output ripple at low load current increases with a large amount of charge being dumped to the output at each switching of the comparator and the flying capacitor.

In voltage regulator 101 of FIG. 1, in order to reduce the output ripple (e.g., the ripple on the output voltage) when the toggling frequency of comparator 151 decreases, the amount of charge provided to node 102 (which is controlled by circuit lanes 131, 132, 133, and 134) can be reduced. This can be accomplished by activating fewer circuit lanes among circuit lanes 131, 132, 133, and 134 when the toggling frequency of comparator 151 decreases. Fewer circuit lanes being activated reduces the charge provided to (e.g., switched into) node 102 and capacitor $C_{LOAD}$, thereby reducing the output ripple.

Figure 3A:
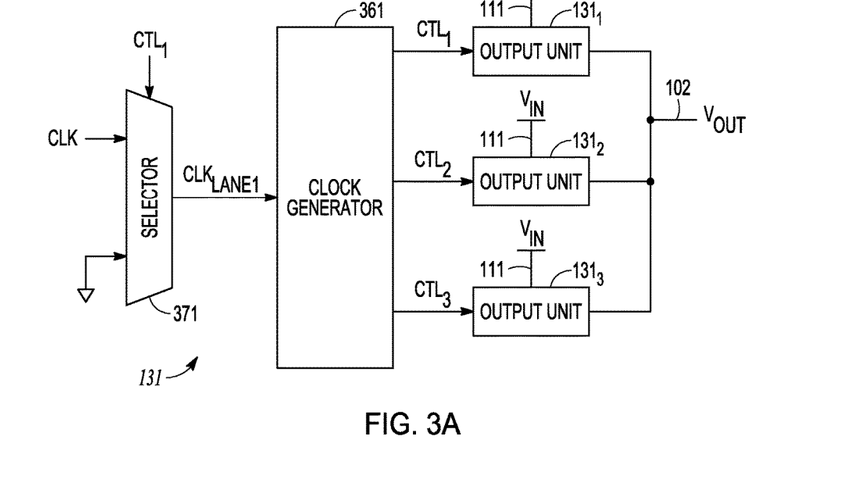
FIG. 3A shows a block diagram of a circuit lane of the voltage regulator FIG. 1, according to some embodiments described herein.

FIG. 3A shows a block diagram of circuit lane 131 of voltage regulator 101 FIG. 1, according to some embodiments described herein. A block diagram of only one circuit lane (e.g., circuit lane 131 in FIG. 3A) of voltage regulator 101 is described herein. Circuit lanes 132, 133, and 134 can have similar (or the same) structure as circuit lane 131 of FIG. 3A. Thus, for simplicity, detailed descriptions of circuit lanes 132, 133, and 134 of voltage regulator 101 FIG. 1 are omitted from the description herein.

Figure 4:
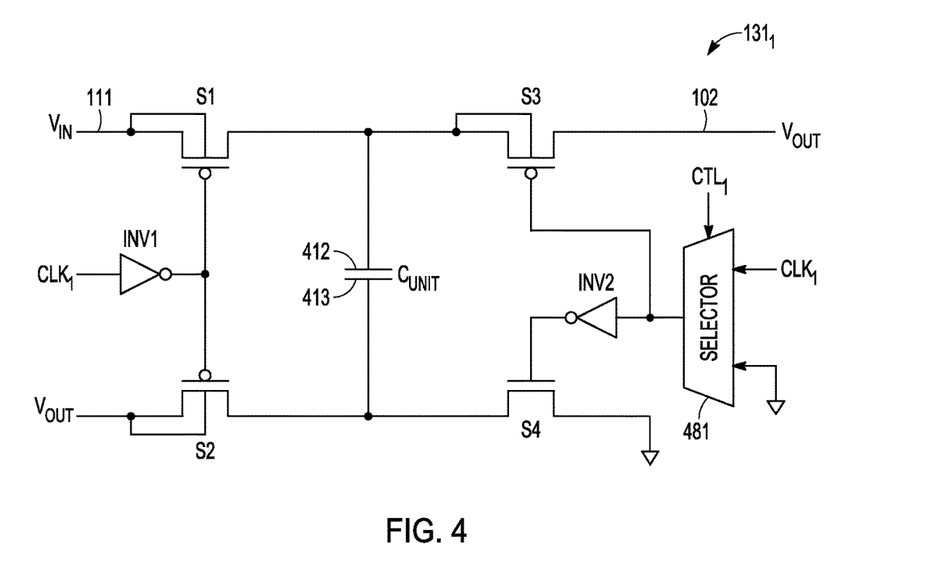
FIG. 4 shows a schematic diagram of an output unit of a circuit lane of FIG. 3A, according to some embodiments described herein.

As shown in FIG. 3A, circuit lane 131 can include output units $131_1$, $131_2$, and $131_3$, each can include a capacitor (e.g., flying capacitor, shown in FIG. 4). FIG. 3A shows circuit lane 131 including a number of three (e.g., M=3) output units $131_1$, $131_2$, and $131_3$ as an example. However, the number of output units (e.g., M) can be different from three.

In FIG. 3A, when circuit lane 131 is in an activated state, output units $131_1$, $131_2$, and $131_3$ can provide (e.g. sequentially provide) charge (from their respective capacitor) to node 102 based on timing of signals (e.g., clock signals) $CLK_1$, $CLK_2$, and $CLK_3$, respectively. Circuit lane 131 can include a clock generator (e.g., a ring oscillator-type clock generator) 361 to generate signals (e.g., clock signals) $CLK_1$, $CLK_2$, and $CLK_3$ based on signal $CLK_{LANE1}$. The waveform of signal $CLK_{LANE1}$ can be either the same waveform as signal CLK or zero (e.g., ground), depending on the level of control signal $CTL_1$, which can be used as a select signal for selector (e.g., multiplexer) 371.

Figure 3B:
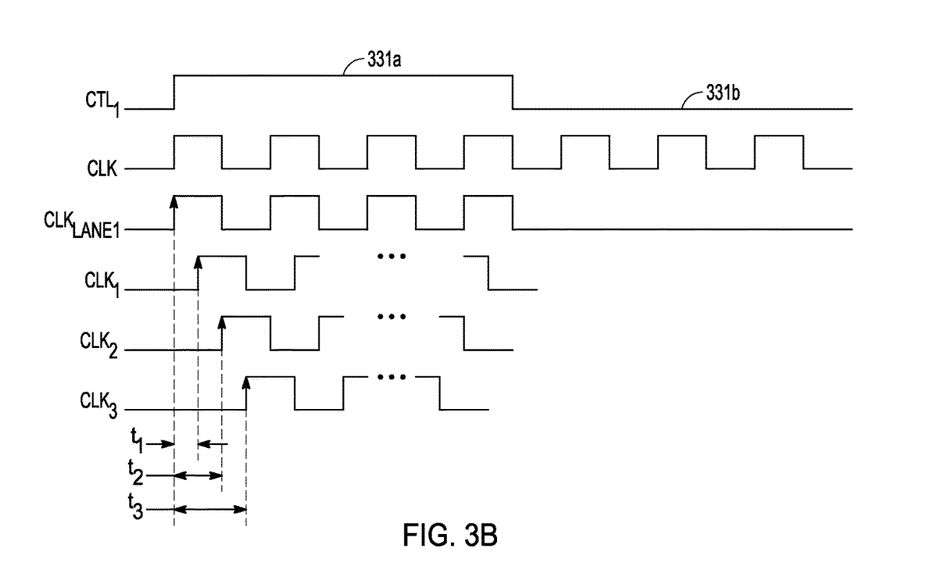
FIG. 3B shows a timing diagram for some signals of the circuit lane of FIG. 3A, according to some embodiments described herein.

FIG. 3B shows a timing diagram for some of the signals of circuit lane 131 of FIG. 3A, according to some embodiments described herein. As shown in FIG. 3B, control signal $CTL_1$ can have levels 331a and 331b, which is controlled by controller 120 (FIG. 1). For example, controller 120 can cause control signal $CTL_1$ to have level 311a if circuit lane 131 is to be activated (to be placed in an activated state). Controller 120 can cause control signal $CTL_1$ to have level 311b if circuit lane 131 is to be deactivated (e.g., to be changed from an activated state to a deactivated state) or if circuit lane 131 is to be kept in a deactivated state (e.g., remain at the current deactivated state).

As shown in FIG. 3B, when control signal $CTL_1$ has level 311a (e.g., circuit lane 131 is in an activated state), selector 371 (FIG. 3A) can select signal CLK to be signal $CLK_{LANE1}$. In this case, clock generator 361 (FIG. 3A) can use signal $CLK_{LANE1}$ to generate signals $CLK_1$, $CLK_2$, and $CLK_3$, such that signals $CLK_1$, $CLK_2$, and $CLK_3$ have different phases with respect to each other and with respect to signal $CLK_{LANE1}$. For example, as shown in FIG. 3B, the phases (e.g., based on the rising edges) of signals $CLK_1$, $CLK_2$, and $CLK_3$ can be shifted from signal $CLK_{LANE1}$ by different time values t1, t2, and t3, respectively. The different phases of signals $CLK_1$, $CLK_2$, and $CLK_3$ allow output units $131_1$, $131_2$, and $131_3$ to sequentially provide charge to node 102. This may minimize any output ripple.

In FIG. 3B, when control signal $CTL_1$ has level 311b (e.g., circuit lane 131 is to be placed in (or kept at) a deactivated state), selector 371 (FIG. 3A) can cause the level of signal $CLK_{LANE1}$ to be zero (e.g., ground). In this case, clock generator 361 can also cause the levels of signals $CLK_1$, $CLK_2$, and $CLK_3$ to be at zero. This causes output units $131_1$, $131_2$, and $131_3$ to stop providing charge to node 102.

FIG. 4 shows a schematic diagram of output unit $131_1$ of FIG. 3A, according to some embodiments described herein. A schematic diagram of only one output unit (e.g., output unit $131_1$ in FIG. 4) of circuit lane 131 is described herein. Output units $131_2$ and $131_3$ have similar (or the same) structure as output unit $131_1$ of FIG. 4. Thus, for simplicity, detail description of output units $131_2$ and $131_3$ of circuit lane 131 are omitted from the description herein.

As shown in FIG. 4, output unit $131_1$ can include a capacitor (e.g., flying capacitor) $C_{UNIT}$ having plates 412 and 413, and switches S1, S2, S3, and S4 arranged to form a switched capacitor arrangement. This switched capacitor arrangement can operate to provide (e.g., transfer) charge from node 111 to node 102. Switches S1, S2, S3, and S4 can be controlled (e.g., turn on or turn off) based on the arrangement of inverters INV1 and INV2, a selector (e.g., multiplexer) 481, and signals $CLK_1$ and $CTL_1$. Switches S1, S2, S3, and S4 can include (e.g., can be structured as) transistors. For example, switches S1, S2, and S3 can include field-effect transistors (FETs), such as p-channel metal-oxide semiconductor field-effect transistor (MOSFET). Switch S4 can include an n-channel MOSFET. Capacitor $C_{UNIT}$ can include a metal-in-metal (MiM) capacitor, a transistor-based capacitor (e.g., capacitor realized by metal-oxide semiconductor field-effect transistor (MOSFET) devices), or other types (e.g., on-die or on-chip) of capacitors. Capacitor $C_{UNIT}$ can be an on-chip capacitor; this means that capacitor $C_{UNIT}$ can be located in (e.g., formed on or formed in) the same IC die on which other components (e.g., controller 120) of voltage regulator 101 are located.

In operation, when circuit lane 131 (FIG. 3A) is in activated state, switches S1, S2, S3, and S4 can turn on and off to alternately couple capacitor $C_{UNIT}$ to nodes 111 and 102. For example, when switches S1 and S2 are turned on (e.g., when signal $CLK_1$ has a level corresponding to logic one (e.g., high), switches S3 and S4 are turned off. This charges capacitor $C_{UNIT}$ (by voltage $V_{IN}$) through a conductive path (through switches S1 and S2) between node 111 and $V_{OUT}$). When switches S1 and S2 are turned off (e.g., when signal $CLK_1$ has a level corresponding to logic zero (e.g., low), switches S3 and S4 are turned on. This causes capacitor $C_{UNIT}$ to discharge (e.g., to provide charge) to node 102 through a conductive path (through switches S3 and S4) between ground and node 102. This process of charging and discharging of capacitor $C_{UNIT}$ can repeat as long as circuit lane 131 is placed in an activated state. The process may stop when circuit lane 131 is placed in a deactivated state.

When circuit lane 131 is in a deactivated state, switches S1 and S2 of output unit $131_1$ (and other similar switches in output units $131_2$ and $131_3$) may not be switched (e.g., may not be turned on and off), they may remain turned off. This may reduce switching losses and improve efficiency. Further, when circuit lane 131 is in a deactivated state, capacitor $C_{UNIT}$ can be put in parallel with capacitor $C_{LOAD}$ (FIG. 1) to further reduce the output ripple. For example, when control signal $CTL_1$ has level 331a (FIG. 3B) in order to cause circuit lane 131 to be in an activated state, selector 481 couples its output to signal $CLK_1$. Switches S3 and S4 are turned on and turned off based on the level of signal $CLK_1$. When control signal $CTL_1$ has level 331b (FIG. 3B) in order to cause circuit lane 131 to be in a deactivated state, selector 481 couples its output to ground. This causes switches S3 and S4 to turn on (and remain turned on as long as signal $CTL_1$ has level 331b), thereby putting capacitor $C_{UNIT}$ in parallel with capacitor $C_{LOAD}$ to further reduce the output ripple, as mentioned above. Moreover, the parasitic capacitor (e.g., between plate 412 of capacitor $C_{UNIT}$ and a substrate (e.g., on-chip semiconductor substrate where capacitor $C_{UNIT}$ is formed)) is also not switched, thereby saving power.

The description above describes an example capacitor network of voltage regulator 101 where the capacitor network can include multiple capacitors (e.g., multiple flying capacitors). For example, if voltage regulator 101 has four circuit lanes 131, 132, 133, and 134 as shown in FIG. 1, each circuit lane has three output units $131_1$, $131_2$, and $131_3$ (FIG. 3A), and each output unit has one capacitor (FIG. 4), then the capacitor network of voltage regulator 101, in this example, has 12 capacitors (e.g., three capacitors in each circuit lane). In this example, an activated circuit lane among circuit lanes 131, 132, 133, and 134 can control the charging and discharging of three respective capacitors among the 12 capacitors. For example, the activated circuit lane can couple three respective capacitors (e.g., in a sequential fashion) alternately between nodes 111 and 102. As an example, if circuit lane 131 (FIG. 3a) is activated, based on signals $CLK_1$, $CLK_2$, and $CLK_3$ in FIG. 3B, circuit lane 131 can sequentially couple three capacitors to node 111 (e.g., when signals $CLK_1$, $CLK_2$, and $CLK_3$ each has logic one (e.g., high) level). Then, circuit lane 131 can decouple the three capacitors from node 111 (e.g., when signals $CLK_1$, $CLK_2$, and $CLK_3$ each has logic zero (e.g., low) level) and sequentially couple the three capacitors to node 102. Other circuit lanes among circuit lanes 132, 133, and 134, if activated, can also operate in a similar fashion.

Figure 5A:
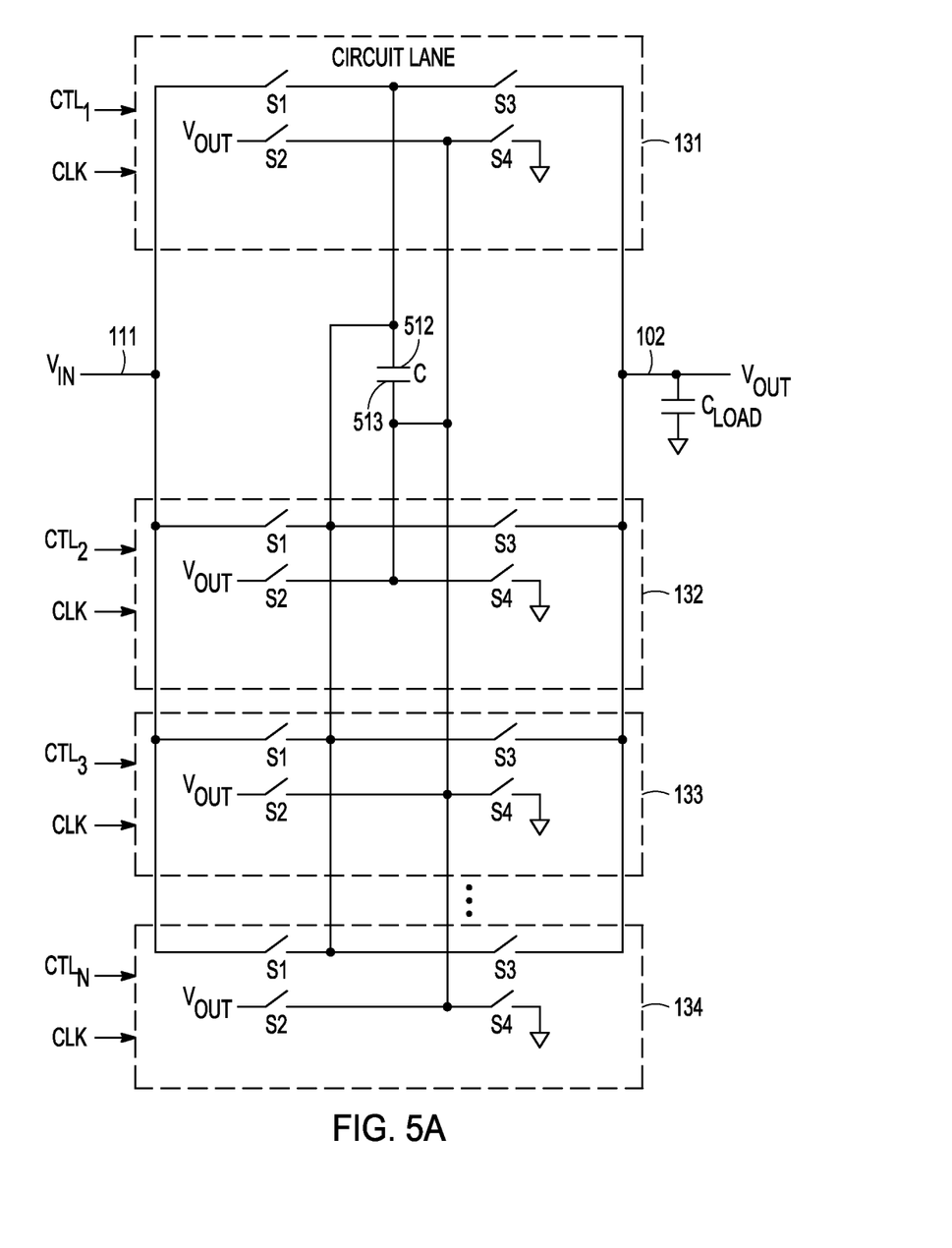
FIG. 5A shows a schematic diagram of circuit lanes and a capacitor network that includes a single capacitor, according to some embodiments described herein.

FIG. 5A shows a schematic diagram of circuit lanes 131, 132, 133, and 134 of FIG. 1 and a capacitor network that includes a single capacitor C (only one flying capacitor) common to circuit lanes 131, 132, 133, and 134, according to some embodiments described herein. Each of circuit lanes 131, 132, 133, and 134 can include switches S1, S2, S3, and S4 that can be similar to, or the same as, switches S1, S2, S3, and S4 shown in FIG. 4.

As shown in FIG. 5A, circuit lanes 131, 132, 133, and 134 can receive respective signals $CTL_1$, $CTL_2$, $CTL_3$, and $CTL_N$ and signal CLK. Signals $CTL_1$, $CTL_2$, $CTL_3$, and $CTL_N$ can be used to activate or deactivate a respective circuit lane among circuit lanes 131, 132, 133, and 134. In each of circuit lanes 131, 132, 133, and 134, signal CLK can be used to generate a clock signal (which is similar to one of signals $CLK_1$, $CLK_2$, and $CLK_3$ in FIG. 3A) to control (turn on or turn off) switches S1, S2, S3, and S4 in the respective circuit lane.

Capacitor C can include plates 512 and 513. Plate 512 is coupled to switch S1 of each of circuit lanes 131, 132, 133, and 134. Plate 513 is coupled to switch S4 of each of circuit lanes 131, 132, 133, and 134.

In an activated circuit lane among circuit lanes 131, 132, 133, and 134, when switches S1 and S2 are turned on, switches S3 and S4 are turned off, thereby charging capacitor C (provided by voltage $V_{IN}$ at node 111) through switches S1 and S2 of the activated circuit lane (or switches S1 and S2 of the activated circuit lanes). When switches S1 and S2 are turned off, switches S3 and S4 are turned on, thereby discharging capacitor C to node 102 through switches S3 and S4 of the activated circuit lane (or switches S3 and S4 of the activated circuit lanes). In the single capacitor (capacitor C) arrangement of FIG. 5A, in a deactivated circuit lane, all switches S1, S2, S3, and S4 can be turned off, so that capacitor C is not coupled to node 102 through switch S3 of the deactivated circuit lane. This allows proper charging and discharging of capacitor C by another activated circuit lane (or circuit lanes).

In FIG. 5A, the effective resistance between capacitor C and nodes 111 and 102 can be controlled by controller 120 (FIG. 1) based on a toggling frequency of signal $COMP_{OUT1}$ in order to adjust an amount of charge provided from capacitor C node 102. The amount of charge provided to capacitor C (e.g., to plate 512) from node 111 can be based on the resistance (total resistance) on the path (or paths) between node 111 and plate 512 of capacitor C (and also from the bottom plate 513 to the switch (and its resistance) to the corresponding node it is going to). As shown in FIG. 5A, each switch S1 is located on a respective path (e.g., circuit path) between node 111 and plate 512 of capacitor C. Thus, the value of the resistance on the paths between node 111 and plate 512 of capacitor C can be controlled by turning on (or turning off) the number of switches S1. This means that the amount of charge provided to capacitor C from node 111, and the amount of charge from capacitor C provided to node 102, can be based on (e.g., proportional to) the number of switches S1 that are turned on.

The number of switches S1 that are turned on can be accomplished by controlling (e.g., increasing or decreasing) the number of circuit lanes among circuit lanes 131, 132, 133, and 134 to be in the activated state (thereby adjusting the resistance on paths coupled to plate 512 of capacitor C). Controller 120 can generate control signals $CTL_1$, $CTL_2$, $CTL_3$, and $CTL_N$ to selectively activate or deactivate circuit lanes 131, 132, 133, and 134, as described above with reference to FIG. 1.

The arrangement of the circuit lanes 131, 132, 133, and 134 and capacitor C may be useful for some situations. Such situations may include a situation where multiple flying capacitors may be unavailable, a situation where device area may be limited (e.g., small) to accommodate multiple flying capacitors, and a situation where an external (e.g., off-die or discrete) flying capacitor may be used.

Figure 5B:
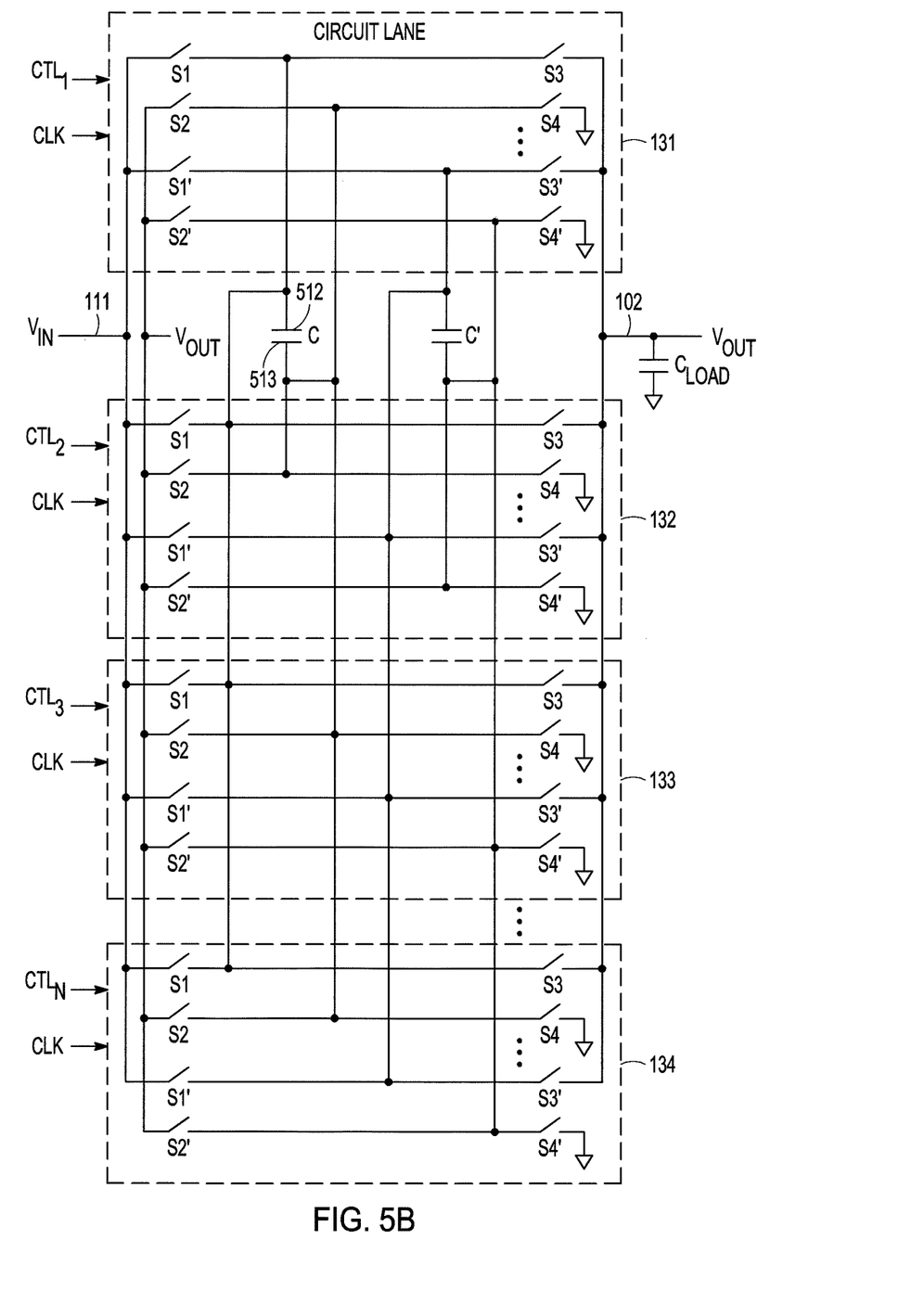
FIG. 5B shows a schematic diagram of circuit lanes and a capacitor network that includes multiple capacitors common to the circuit lanes, according to some embodiments described herein.

FIG. 5B shows a schematic diagram of circuit lanes 131, 132, 133, and 134 of FIG. 1 and a capacitor network that includes multiple capacitors (e.g., flying capacitor) C and C' common to circuit lanes 131, 132, 133, and 134, according to some embodiments described herein. Circuit lanes 131, 132, 133, and 134 the capacitor network in FIG. 5B can be a variation of circuit lanes 131, 132, 133, and 134 the capacitor network in FIG. 5A. FIG. 5A shows an example of a single-phase arrangement where each of circuit lanes 131, 132, 133, and 134 includes only one group of switches (e.g., S1, S2, S3, and S4) that can control the charging and discharging of capacitor C. FIG. 5B shows an example of a multi-phase arrangement where each of circuit lanes 131, 132, 133, and 134 includes multiple groups of switches (e.g., a group including switches S1, S2, S3, and S4 and another group including switches S1', S2', S3', and S4'). Each of the groups of switches in FIG. 5B can control a respective capacitor (e.g., capacitor C or capacitor C').

As shown in FIG. 5B, circuit lanes 131, 132, 133, and 134 can receive respective signals $CTL_1$, $CTL_2$, $CTL_3$, and $CTL_N$ and signal CLK. Signals $CTL_1$, $CTL_2$, $CTL_3$, and $CTL_N$ can be used to activate or deactivate a respective circuit lane among circuit lanes 131, 132, 133, and 134. In each of circuit lanes 131, 132, 133, and 134, signal CLK can be used to generate multiple clock signals (which are similar to signals $CLK_1$, $CLK_2$, and $CLK_3$ in FIG. 3A) to control (turn on or turn off) switches S1, S2, S3, and S4 (e.g., using of the multiple clock signals) and switches S1', S2', S3', and S4' (e.g., using another one of the multiple clock signals). Controlling of switches S1, S2, S3, and S4 in FIG. 5B in order to control the charging and discharging of capacitor C inn FIG. 5B is described above with reference to FIG. 5A.

Switches S1', S2', S3', and S4' in FIG. 5B can be controlled in ways similar to that of switches S1, S2, S3, and S4, respectively. For example, in an activated circuit lane among circuit lanes 131, 132, 133, and 134, when switches S1' and S2' are turned on, switches S3' and S4' are turned off, thereby charging capacitor C' (provided by voltage $V_{IN}$ at node 111) through switches S1' and S2' of the activated circuit lane (or switches S1' and S2' of the activated circuit lanes). When switches S1' and S2' are turned off, switches S3' and S4' are turned on, thereby discharging capacitor C' to node 102 through switches S3' and S4' of the activated circuit lane (or switches S3' and S4' of the activated circuit lanes). Thus, the amount of charge provided to capacitor C' from node 111, and the amount of charge from capacitor C' provided to node 102, can be based on (e.g., proportional to) the number of switches S1' that are turned on.

FIG. 5B shows an example of a two-phase arrangement (e.g., two groups of switches in each circuit lane and two flying capacitors common to the circuit lanes). However, the arrangement of FIG. 5B can be different (e.g., three phases or greater). For example, in some arrangements, each of circuit lanes 131, 132, 133, and 134 in FIG. 5B can include X groups of switches (where X is an integer equal to at least two) and there can be X flying capacitors, in which the charging and discharging of each of the X flying capacitors can be controlled by a respective group of switches in each of circuit lanes 131, 132, 133, and 134.

Figure 6:
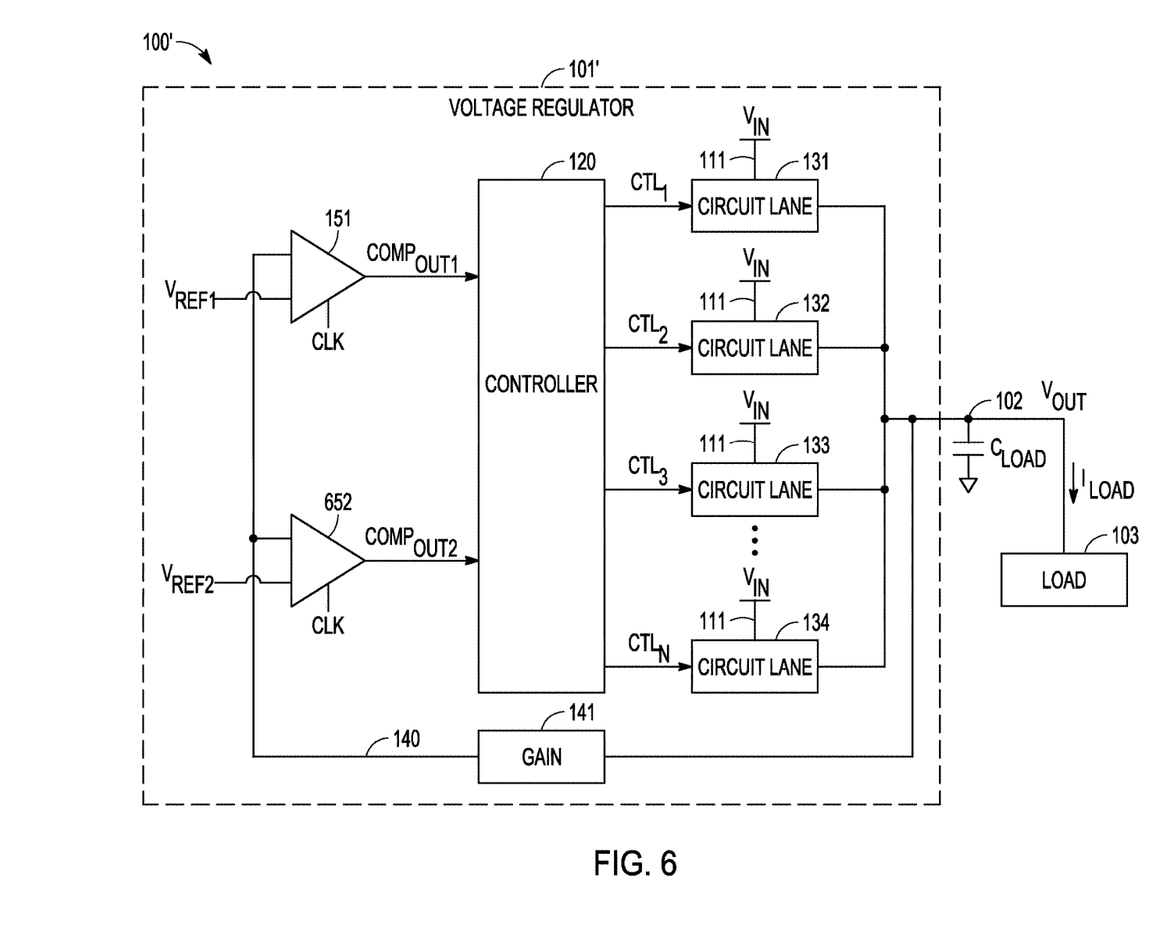
FIG. 6 shows an apparatus including a variation of the voltage regulator of FIG. 1, according to some embodiments described herein.

FIG. 6 shows an apparatus 100' including a voltage regulator 101', which can be a variation of voltage regulator 101 of FIG. 1, according to some embodiments described herein. The components of apparatus 101' are similar to, or the same as, the components of apparatus 100 except for comparator 652 and its associated signals. For simplicity, similar components between apparatuses 100 and 101' are not repeated.

As described above with reference to FIG. 1 through FIG. 5B, comparator 151 can operate to as a main comparator (e.g., a single comparator in voltage regulator 101 in FIG. 1) to allow controller 120 to dynamically control (e.g., activate or deactivate) the number of activated circuit lanes among circuit lanes 131, 132, 133, and 134. The dynamic control, as described above, can control the charging and discharging the capacitor network to improve operations (e.g., reduce ripple and increase efficiency of voltage regulator 101).

Comparator 652 in FIG. 6 can operate (e.g., operate as a secondary comparator) to allow voltage regulator 101' to improve operations of voltage regulator 101' during certain events, such as during a transient event. Comparator 652 can be a clocked comparator (e.g., bang-bang PFM comparator). As shown in FIG. 6, comparator 652 can include inputs to receive voltage $V_{FB}$ and voltage $V_{REF2}$ (e.g., a reference voltage) and signal CLK. The value of voltage $V_{REF2}$ can be less than the value of voltage $V_{REF1}$.

During an operation of voltage regulator 101', comparator 652 can compare the values of voltages $V_{FB}$ and $V_{REF2}$ and generate signal (comparator output signal) $COMP_{OUT2}$ having a value (e.g., a level corresponding to logic zero or one) based on the result of the comparison. For example, signal $COMP_{OUT2}$ can have a level (e.g., high) corresponding to logic one if $V_{FB}<V_{REF2}$ (the value of voltage $V_{FB}$ is less than the value of voltage $V_{REF2}$) during the portion of period 150 (FIG. 2) when signal CLK has level 150b. Signal $COMP_{OUT2}$ (FIG. 6) can have a level (e.g., low) corresponding to logic zero if $V_{FB}>V_{REF2}$ (the value of voltage $V_{FB}$ is greater than the value of voltage $V_{REF2}$) during the portion of period 150 when signal CLK has level 150b.

Controller 120 can use signals $COMP_{OUT1}$ and $COMP_{OUT2}$ to control circuit lanes 131, 132, 133, and 134 based on different load conditions. For example, for slow changes in load current, controller 120 can activate or deactivate an appropriate number of circuit lanes 131, 132, 133, and 134 based on signal $COMP_{OUT1}$ from comparator 151. For fast changes in load current (e.g., during a transient event), controller 120 can activate all circuit lanes 131, 132, 133, and 134 based on signal $COMP_{OUT2}$ from comparator 652 (e.g., when signal $COMP_{OUT2}$ indicates that $V_{FB}<V_{REF2}$).

Figure 7:
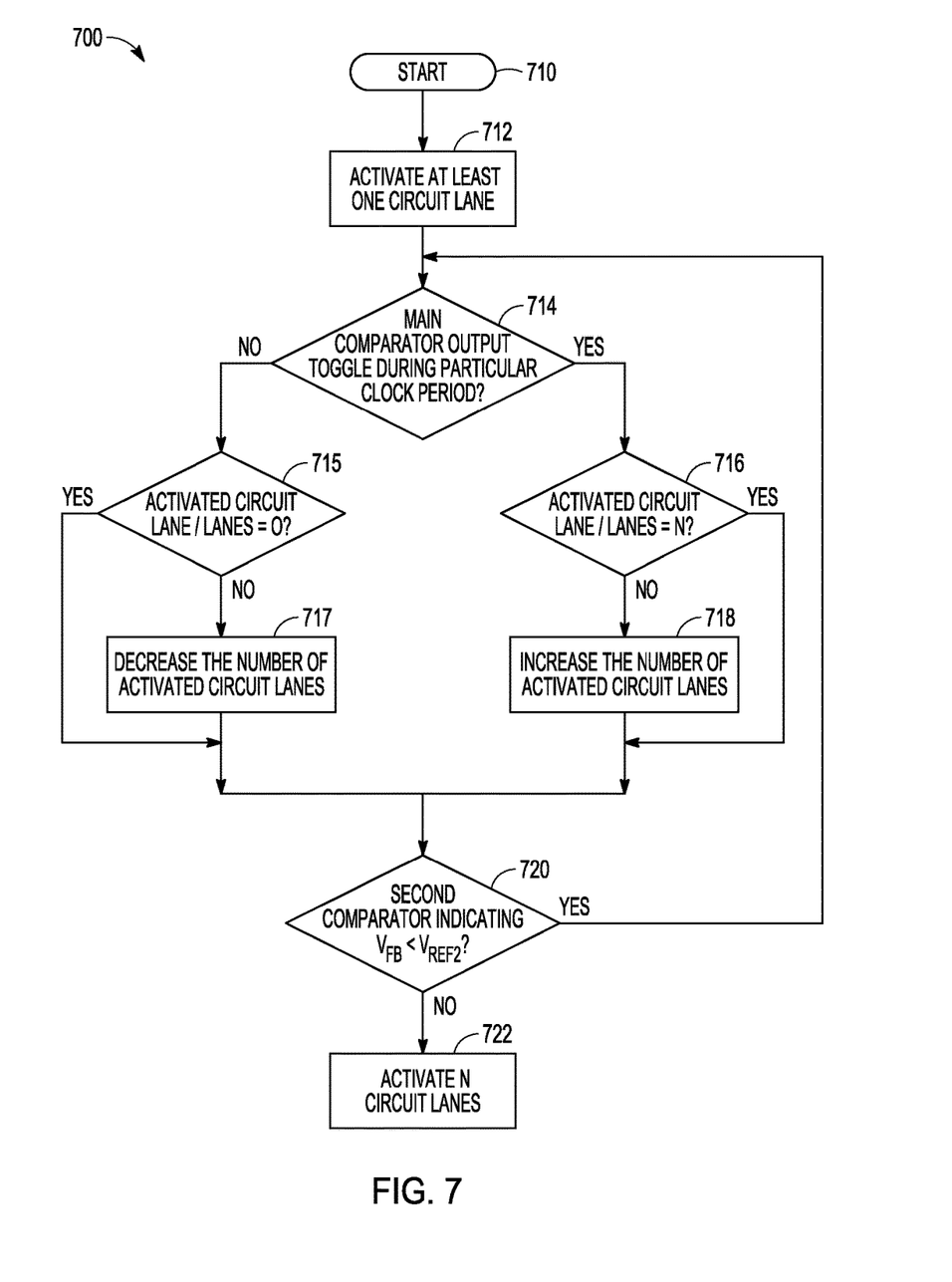
FIG. 7 is a flowchart showing a method of controlling a voltage regulator, according to some embodiments described herein.

FIG. 7 is a flowchart showing a method 700 of controlling a voltage regulator, according to some embodiments described herein. Method 700 can be part of an algorithm for the operation of controller 120 to control voltage regulator 101, as described above with reference to FIG. 1 through FIG. 6. Method 700 can be performed by software, firmware, hardware (e.g., logic circuitry), or any combination of software, firmware, and hardware.

Method 700 can start at activity 710 (e.g. at power on). Then, activity 712 of method 700 can include activating at least one circuit lane (one of circuit lanes 131, 132, 133, and 134). This means that only one of circuit lanes 131, 132, 133, and 134 (FIG. 4), more than one but fewer than N circuit lanes, or all N circuit lanes can be activated in activity 712. Activity 714 of method 700 can include determining whether the signal at the output (e.g., signal $COMP_{OUT1}$) of a main comparator (e.g., comparator 151 in FIG. 1) toggles during a particular period of a clock signal (e.g., signal CLK in FIG. 2). As an example, in FIG. 2, signal $COMP_{OUT1}$ toggles during each period 150 between times T0 and T5 and does not toggle (e.g., skip toggling) during period 150 between times T2 and T3. Depending on the determination in activity 714, method 700 can adjust (e.g., increase or decrease) the number of activated circuit lanes. The number of activated circuit lanes can include only one activated circuit lanes or multiple activated circuit lanes.

Based on activity 714, if the output of the main comparator toggles during a particular period of the clock signal, then method 700 can continue with activity 716, which can include determining whether the number of activated circuit lanes is equal to the maximum number (e.g., N) of the circuit lanes (e.g., determining whether there are still circuit lanes (e.g., in a deactivated state) to be activated). If the number of activated circuit lanes (in activity 716) is not equal to the maximum number of circuit lanes, method 700 can continue with activity 718, which can include increasing the current number of activated circuit lanes (e.g., by placing one more circuit lane in an activated state). If the number of activated circuit lanes (in activity 716) is equal to maximum number of circuit lanes (e.g., no more available deactivated circuit lanes), method 700 can skip activity 718 and continue with activity 720.

Activity 720 can include determining whether $V_{FB}<V_{REF2}$. For example, activity 720 can determine whether signal $COMP_{OUT2}$ at the output of comparator 752 (FIG. 6) has a level (e.g., logic one) that indicates $V_{FB}<V_{REF2}$. If $V_{FB}<V_{REF2}$, then activity 722 can include placing all (e.g., N) circuit lanes in an activated state and going back to activity 714. If $V_{FB}<V_{REF2}$ is not true ($V_{FB}$ is not less than $V_{REF2}$), then method 700 can skip activity 722 and go back to activity 714.

Based on activity 714, if the output of the main comparator does not toggle during a particular period of the clock signal, then method 700 can continue with activity 715, which can include determining whether the number of activated circuit lanes is zero (whether there are still circuit lanes (e.g., in a activated state) to be deactivated). If the number of activated circuit lanes (determined in activity 715) is not equal to the zero, method 700 can continue with activity 717, which can include decreasing the current number of activated circuit lanes (e.g., by deactivating one more circuit lane). If the number of activated circuit lanes (determined in activity 715) is equal to zero, method 700 can skip activity 717 and continue with activity 720 and the process can continue with activity 722 or skip activity 722 and go to activity 714. Method 700 can repeat the process from activity 714.

Method 700 can include fewer or more activities relative to the activities shown in FIG. 7. For example, method 700 can include activities and operations of voltage regulator 101 with reference to FIG. 1 through FIG. 6.

Figure 8:
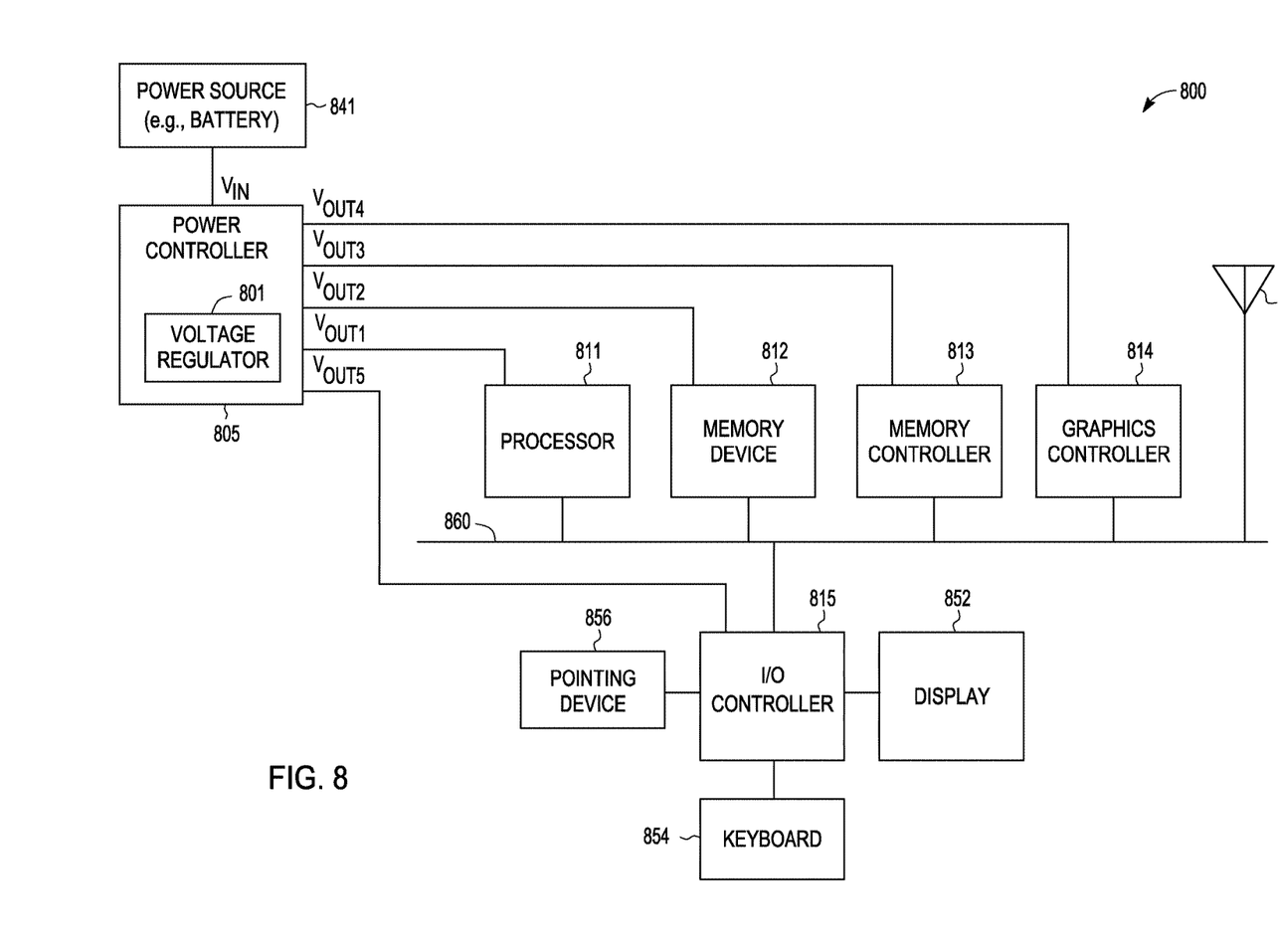
FIG. 8 shows an apparatus in the form of an electronic system including a voltage regulator, according to some embodiments described herein.

FIG. 8 shows an apparatus in the form of a system (e.g., electronic system) 800, according to some embodiments described herein. System 800 can include or be included in a computer, a cellular phone, or other electronic systems. As shown in FIG. 8, system 800 can include a power controller 805, a processor 811, a memory device 812, a memory controller 813, a graphics controller 814, an input and output (I/O) controller 815, a display 852, a keyboard 854, a pointing device 856, at least one antenna 858, and a bus 860.

Each of processor 811, memory device 812, memory controller 813, graphics controller 814, and I/O controller 815 can include a load, such as load 103 of FIG. 1.

Processor 811 can include a general-purpose processor or an application specific integrated circuit (ASIC). Processor 811 can include a CPU.

Memory device 812 can include a dynamic random access memory (DRAM) device, a static random access memory (SRAM) device, a flash memory device, phase change memory, or a combination of these memory devices, or other types of memory. FIG. 8 shows an example where memory device 812 is a stand-alone memory device separated from processor 811. In an alternative arrangement, memory device 812 and processor 811 can be located on the same IC die. In such an alternative arrangement, memory device 812 is an embedded memory in processor 811, such as embedded DRAM (eDRAM), embedded SRAM (eSRAM), embedded flash memory, or another type of embedded memory.

Display 852 can include a liquid crystal display (LCD), a touchscreen (e.g., capacitive or resistive touchscreen), or another type of display. Pointing device 856 can include a mouse, a stylus, or another type of pointing device.

I/O controller 815 can include a communication module for wired or wireless communication (e.g., communication through one or more antennas 858). Such wireless communication may include communication in accordance with WiFi communication technique, Long Term Evolution Advanced (LTE-A) communication technique, or other communication techniques.

Power controller 805 can be arranged to receive power (e.g., supply voltage) from a power source 841 that can provide a voltage $V_{IN}$, which can correspond to voltage $V_{IN}$ described above with reference to FIG. 1 through FIG. 6. Power controller 805 can provide voltages $V_{OUT1}$, $V_{OUT2}$, $V_{OUT3}$, $V_{OUT4}$, and $V_{OUT5}$ based on voltage $V_{IN}$. Each of voltages $V_{OUT1}$, $V_{OUT2}$, $V_{OUT3}$, $V_{OUT4}$, and $V_{OUT5}$ can correspond to voltage $V_{OUT}$ described about with reference to FIG. 1 through FIG. 6. Voltages $V_{OUT1}$, $V_{OUT2}$, $V_{OUT3}$, $V_{OUT4}$, and $V_{OUT5}$ can be provided to processor 811, memory device 812, memory controller 813, graphics controller 814, and I/O controller 815, respectively.

Power controller 805 can include a voltage regulator 801 to control the value at least one of voltages $V_{OUT1}$, $V_{OUT2}$, $V_{OUT3}$, $V_{OUT4}$, and $V_{OUT5}$ in ways similar to, or the same as, controlling of voltage $V_{OUT}$ described above with reference to FIG. 1 or FIG. 7.

FIG. 8 shows the components of system 800 arranged separately from each other as an example. For example, each of processor 811, memory device 812, memory controller 813, graphics controller 814, and I/O controller 815 can be located on a separate IC die (e.g., a semiconductor die or an IC chip). In some arrangements, two or more components (e.g., processor 811, memory device 812, graphics controller 814, and I/O controller 815) of system 800 can be located on the same die (e.g., same IC chip), forming a system-on-chip.

In some arrangements, system 800 does not have to include a display. Thus, display 852 can be omitted from system 800. In some arrangements, system 800 does not have to include an antenna. Thus, antenna 858 can be omitted from system 800.

The voltage regulator (e.g., voltage regulators 101 and 801) and method (e.g., operations of the voltage regulator) described above can provide improvements over some conventional techniques. Some example improvements may include the following. An example improvement includes reduced ripple across load current range relative to conventional (e.g., PFM) techniques where only frequency is controlled and all flying capacitors are switched to regulate the output based on comparator output, thereby making a large amount of charge transfer at every switching event. This may cause larger ripple in conventional techniques. Another example improvement includes a higher efficiency across load current range relative to conventional techniques where only switching frequency is controlled based on comparator output and all switches and all parasitic capacitors are switched to regulate the output. Another example improvement includes a reduced area relative to conventional analog control techniques which control the resistance of switches. Another example improvement includes higher power efficiency relative to conventional analog techniques because the voltage regulator (e.g., voltage regulator 101) described herein is a digital-based voltage regulator. Thus, unlike some analog-based voltage regulators, voltage regulator 101 may have minimal or no static power consumption. Another example improvement includes less complexity in circuit design because the voltage regulator described herein can be synthesized digitally. Another example improvement includes process independence because the voltage regulator described herein is digital-based voltage regulator, thereby avoiding analog components.

The illustrations of the apparatuses (e.g., apparatus 100 including voltage regulator 101 and system 800) and methods (e.g., method 700 and operations of voltage regulator 101) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

Additional Notes and Examples

Example 1 includes subject matter (such as a device, an electronic apparatus (e.g., circuit, electronic system, or both), or a machine) including a first node to receive an input voltage, a second node to provide an output voltage, circuit lanes coupled to the first and second nodes, each of the circuit lanes including switches coupled between first and second nodes, and a controller to selectively place at least one circuit lane among the circuit lanes in an activated state to cause the at least one circuit lane to control the switches in order to adjust an amount of charge provided from a capacitor network to the output node based on a toggling frequency of a comparator output signal generated based on a comparison between a value of a reference voltage and a value of a feedback voltage generated from a value of the output voltage.

In Example 2, the subject matter of Example 1 may optionally include, wherein the amount of charge provided from the capacitor network to the output node is proportional to a number of activated circuit lanes among the circuit lanes.

In Example 3, the subject matter of Example 2 may optionally include, wherein the capacitor network includes a plurality of capacitors, each of the circuit lanes is configured to control charging and discharging of least one capacitor of the plurality of capacitors.

In Example 4, the subject matter of Example 1 may optionally include, wherein the capacitor network includes a single capacitor, the single capacitor coupled to the switches of each of the circuit lanes.

In Example 5, the subject matter of Example 1 may optionally include, wherein the capacitor network includes multiple capacitors, each of the multiple capacitors coupled to the switches of each of the circuit lanes.

In Example 6, the subject matter of Example 4 may optionally include, wherein the controller is configured to control an effective resistance between the single capacitor and the first and second nodes based on the toggling frequency of the comparator output signal in order to adjust the amount of charge provided from the capacitor network to the output node.

In Example 7, the subject matter of Example 1 may optionally include, wherein the controller is configured to generate a plurality of control signals to place different circuit lanes in the activated state based on different control signals among the plurality of control signals.

In Example 8, the subject matter of any of Examples 1-8 may optionally include, wherein the circuit lanes, the controller, and the capacitor network are included in a same integrated circuit die.

Example 9 includes subject matter (such as a device, an electronic apparatus (e.g., circuit, electronic system, or both), or a machine) including a first node to receive an input voltage, a second node to provide an output voltage, circuit lanes coupled to the first and second nodes, each of the circuit lanes including capacitors and switches, and a controller to selectively place at least one circuit lane among the circuit lanes in an activated state to cause the at least one circuit lane to alternately couple at least one capacitor of the capacitors in the at least one circuit lane to the first node and the second node based on a value of a feedback voltage from a feedback path coupled to the second node in order to cause the value of the output voltage to be proportional to a number of activated circuit lanes among the circuit lanes.

In Example 10, the subject matter of Example 9 may optionally include, further comprising a comparator to compare the value of the feedback voltage with a value of a reference voltage to generate a comparator output signal, wherein the controller is configured to selectively place the at least one circuit lane among the circuit lanes in the activated state based on a toggling frequency of the comparator output signal.

In Example 11, the subject matter of Example 10 may optionally include, wherein the controller is configured to adjust the number of activated circuit lanes among the circuit lanes based on the toggling frequency of the comparator output signal.

In Example 12, the subject matter of Example 10 may optionally include, wherein the controller is configured to adjust the number of activated circuit lanes among the circuit lanes if the comparator output signal skips changing from one level to another level during a period of a clock signal.

In Example 13, the subject matter of Example 10 may optionally include, further comprising an additional comparator to compare the value of the feedback voltage with a value of an additional reference voltage to generate an additional comparator output signal, wherein the controller is configured to place all of the circuit lanes in the activated state based on the level of the additional comparator output signal.

In Example 14, the subject matter of Example 9 may optionally include, wherein a circuit lane among the circuit lanes includes output units, each of the output units including a capacitor included in the capacitors of the circuit lane, the circuit lane configured to alternately couple the capacitor in each of the output units to the first and second nodes if the circuit lane is placed in the activated state by the controller.

In Example 15, the subject matter of Example 14 may optionally include, wherein the circuit lane is configured to couple the capacitor in each of the output units in parallel with a capacitor coupled to the second node if the circuit lane is placed in a deactivated state by the controller.

In Example 16, the subject matter of Example 13 may optionally include, wherein the output unit includes a first switch coupled between the first node and a first plate of the capacitor, a second switch coupled between a second plate of the capacitor and the second node, a third switch coupled between the second node and a first plate of the capacitor, and a fourth switch coupled between the second plate of the capacitor and ground.

In Example 17, the subject matter of Example 14 may optionally include, wherein an additional circuit lane among the circuit lanes includes additional output units, each of the additional output units including a capacitor included in the capacitors of the additional circuit lane, the additional circuit lane configured to alternately couple the capacitor in each of the additional output units to the first and second nodes if the additional circuit lane is placed in the activated state by the controller.

Example 18 includes subject matter (such as a device, an electronic apparatus (e.g., circuit, electronic system, or both), or a machine) including a processor, and a voltage regulator coupled to the processor, the voltage regulator including a first node to receive an input voltage, a second node to provide an output voltage, circuit lanes coupled to the first and second nodes, each of the circuit lanes including switches coupled between first and second nodes, and a digital controller to selectively place at least one circuit lane among the circuit lanes in an activated state to cause the at least one circuit lane to control the switches in order to adjust an amount of charge provided from a capacitor network to the output node based on a toggling frequency of a comparator output signal generated based on a comparison between a value of a reference voltage and a value of a feedback voltage generated from a value of the output voltage.

In Example 19, the subject matter of Example 18 may optionally include, wherein the digital controller is configured to adjust a number of activated circuit lanes among the circuit lanes based on a value of the feedback voltage.

In Example 20, the subject matter of Example 18 or 19 may optionally include, further comprising at least one of an antenna coupled to the processor and a display coupled to the processor.

Example 21 includes subject matter (such as a method of operating a device, an electronic apparatus (e.g., circuit, electronic system, or both), or a machine) including comparing a value of a reference voltage and a feedback voltage to generate a comparator output signal, the feedback voltage generated based on an output voltage at an output node of a voltage regulator, placing at least one circuit lane among circuit lanes in an activated state, and adjusting a number of activated circuit lanes among circuit lanes based on the comparator output signal in order to adjust an amount of charge provided from a capacitor network to the output node.

In Example 22, the subject matter of Example 21 may optionally include, wherein placing at least one circuit lane among circuit lanes in the activated state includes placing a first circuit lane among the circuit lanes in the activated state based on a first control signal, and placing a second circuit lane among the circuit lanes in the activated state based on a second control signal.

In Example 23, the subject matter of Example 22 may optionally include, wherein the capacitor network includes a plurality of capacitors, the first circuit lane includes multiple capacitors included in the plurality of capacitors, and adjusting the amount of charge provided from the capacitor network to the output node includes sequentially coupling the multiple capacitors to the input node, decoupling the multiple capacitors from the input node, and sequentially coupling the multiple capacitors to the output node.

In Example 24, the subject matter of Example 23 may optionally include, wherein the second circuit lane includes additional multiple capacitors included in the plurality of capacitors, and adjusting the amount of charge provided from the capacitor network to the output node includes sequentially coupling the additional multiple capacitors to the input node, decoupling the additional multiple capacitors from the input node, and sequentially coupling the additional multiple capacitors to the output node.

In Example 25, the subject matter of Example 21 may optionally include, wherein further comprising comparing the value of the feedback voltage with a value of an additional reference voltage to generate an additional comparator output signal, and placing all of the circuit lanes in the activated state based on a level of the additional comparator output signal.

Example 26 includes subject matter (such as a device, an electronic apparatus (e.g., circuit, electronic system, or both), or machine) including means for performing any of the subject matter of examples 21-25.

The subject matter of Example 1 through Example 26 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a first node to receive an input voltage;
    a second node to provide an output voltage;
    circuit lanes coupled to the first and second nodes, each of the circuit lanes including switches coupled between the first and second nodes; and
    a controller to selectively place at least one circuit lane among the circuit lanes in an activated state to cause the at least one circuit lane to control the switches in order to adjust an amount of charge provided from a capacitor network to the output node based on a toggling frequency of a comparator output signal generated based on a comparison between a value of a reference voltage and a value of a feedback voltage generated from a value of the output voltage, wherein the amount of charge provided from the capacitor network to the output node is proportional to a number of activated circuit lanes among the circuit lanes.

2. The apparatus of claim 1, wherein the capacitor network includes a plurality of capacitors, each of the circuit lanes is configured to control charging and discharging of least one capacitor of the plurality of capacitors.

3. The apparatus of claim 1, wherein the capacitor network includes a single capacitor, the single capacitor coupled to the switches of each of the circuit lanes.

4. The apparatus of claim 1, wherein the capacitor network includes multiple capacitors, each of the multiple capacitors coupled to the switches of each of the circuit lanes.

5. The apparatus of claim 3, wherein the controller is configured to control an effective resistance between the single capacitor and the first and second nodes based on the toggling frequency of the comparator output signal in order to adjust the amount of charge provided from the capacitor network to the output node.

6. The apparatus of claim 1, wherein the controller is configured to generate a plurality of control signals to place different circuit lanes in the activated state based on different control signals among the plurality of control signals.

7. The apparatus of claim 1, wherein the circuit lanes, the controller, and the capacitor network are included in a same integrated circuit die.

8. An apparatus comprising:
    a first node to receive an input voltage;
    a second node to provide an output voltage; circuit lanes coupled to the first and second nodes, each of the circuit lanes including capacitors and switches; and
    a controller to selectively place at least one circuit lane among the circuit lanes in an activated state to cause the at least one circuit lane to alternately couple at least one capacitor of the capacitors in the at least one circuit lane to the first node and the second node based on a value of a feedback voltage from a feedback path coupled to the second node in order to cause the value of the output voltage to be proportional to a number of activated circuit lanes among the circuit lanes,
    a comparator to compare the value of the feedback voltage with a value of a reference voltage to generate a comparator output signal, wherein the controller is configured to selectively place the at least one circuit lane among the circuit lanes in the activated state based on a toggling frequency of the comparator output signal.

9. The apparatus of claim 8, wherein the controller is configured to adjust the number of activated circuit lanes among the circuit lanes based on the toggling frequency of the comparator output signal.

10. The apparatus of claim 8, wherein the controller is configured to adjust the number of activated circuit lanes among the circuit lanes if the comparator output signal skips changing from one level to another level during a period of a clock signal.

11. The apparatus of claim 8, further comprising an additional comparator to compare the value of the feedback voltage with a value of an additional reference voltage to generate an additional comparator output signal, wherein the controller is configured to place all of the circuit lanes in the activated state based on the level of the additional comparator output signal.

12. The apparatus of claim 8, wherein a circuit lane among the circuit lanes includes output units, each of the output units including a capacitor included in the capacitors of the circuit lane, the circuit lane configured to alternately couple the capacitor in each of the output units to the first and second nodes if the circuit lane is placed in the activated state by the controller.

13. The apparatus of claim 12, wherein the circuit lane is configured to couple the capacitor in each of the output units in parallel with a capacitor coupled to the second node if the circuit lane is placed in a deactivated state by the controller.

14. The apparatus of claim 11, wherein the output unit includes a first switch coupled between the first node and a first plate of the capacitor, a second switch coupled between a second plate of the capacitor and the second node, a third switch coupled between the second node and a first plate of the capacitor, and a fourth switch coupled between the second plate of the capacitor and ground.

15. The apparatus of claim 12, wherein an additional circuit lane among the circuit lanes includes additional output units, each of the additional output units including a capacitor included in the capacitors of the additional circuit lane, the additional circuit lane configured to alternately couple the capacitor in each of the additional output units to the first and second nodes if the additional circuit lane is placed in the activated state by the controller.

16. An electronic system comprising:
   a processor; and
   a voltage regulator coupled to the processor, the voltage regulator including:
   a first node to receive an input voltage;
   a second node to provide an output voltage;
   circuit lanes coupled to the first and second nodes, each of the circuit lanes including switches coupled between first and second nodes; and
   a digital controller to selectively place at least one circuit lane among the circuit lanes in an activated state to cause the at least one circuit lane to control the switches in order to adjust an amount of charge provided from a capacitor network to the output node based on a toggling frequency of a comparator output signal generated based on a comparison between a value of a reference voltage and a value of a feedback voltage generated from a value of the output voltage,
   wherein the digital controller is configured to adjust a number of activated circuit lanes among the circuit lanes based on a value of the feedback voltage.

17. The electronic system of claim 16, further comprising at least one of an antenna coupled to the processor and a display coupled to the processor.

* * * * *